SELF-TESTING MEANS FOR COMPUTER CONTROL SIGNAL ATTENUATING DEVICES

Filed Nov. 7, 1962 6 Sheets-Sheet 1

INVENTORS
KURT MOSES
ERNEST HARTOG
BY Roland Plottel
ATTORNEY

INVENTORS
KURT MOSES
ERNEST HARTOG

BY Roland Plottel
ATTORNEY

INVENTORS
KURT MOSES
ERNEST HARTOG
BY Roland Plottel
ATTORNEY

Sept. 27, 1966 K. MOSES ETAL 3,275,810
SELF-TESTING MEANS FOR COMPUTER CONTROL SIGNAL ATTENUATING DEVICES
Filed Nov. 7, 1962 6 Sheets-Sheet 4
FIG. 8
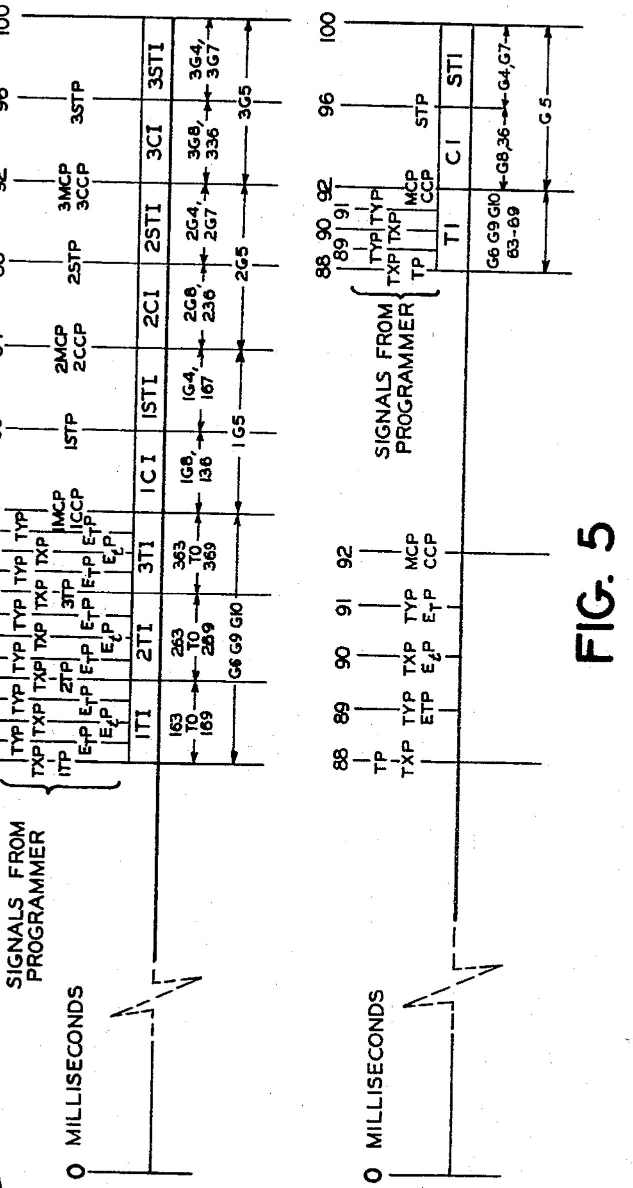
FIG. 5
FIG. 4
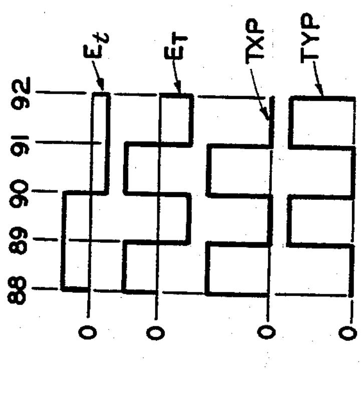
INVENTORS
KURT MOSES
ERNEST HARTOG
BY Roland Plottel
ATTORNEY INVENTORS
KURT MOSES
ERNEST HARTOG
BY Roland Plottel
ATTORNEY INVENTORS
KURT MOSES
ERNEST HARTOG
BY Roland Plottel
ATTORNEY 3,275,810

SELF-TESTING MEANS FOR COMPUTER CONTROL SIGNAL ATTENUATING DEVICES

Kurt Moses, Dumont, N.J., and Ernest Hartog, New York, N.Y., assignors to The Bendix Corporation, Teterboro, N.J., a corporation of Delaware Filed Nov. 7, 1962, Ser. No. 236,065
16 Claims. (Cl. 235—151.31)

This invention relates to self-testing means for a computer controlled variable resistance signal attenuating device.

It is contemplated that the novel test means preferably will form an integral part of the device to be tested. The device to be tested is comprised of a network of voltage divider circuits, each having a control gate and computer means connected to the gates for controlling transmission by the shunt legs of the various divider circuits to provide desired signal attenuation. A control network provides a direction control signal and a logic network provides a compute pulse that is applied to the computer means for adjusting the transmission condition of the attenuating network in response to a programmed pulse signal.

A device of this kind is particularly adapted for use in a self-adaptive control system as shown and described as the controller in the copending U.S. application Serial No. 56,033 of A. Unger and G. Pfersch, filed September 14, 1962 and assigned to the same assignee as the present application. Although the controller of the aforementioned application is embodied in a self-adaptive control system for vehicles capable of flight, the novel self-testing arrangement should not be limited thereto and may be included in any comparable device that receives two input signals, attenuates one signal and transmits the attenuated signal to provide desired information, and has means responsive to the difference between the two input signals for adjusting signal attenuation.

An object of this invention is to provide test means for computer-controlled variable resistance signal attenuating devices.

Another object of this invention is to provide test means for a computer-controlled variable resistance signal attenuating device in which the test means forms an integral part of the device to be tested.

Another object of this invention is to provide the test means for a controlled signal attenuating device with a programmed operating sequence in which the test means is sequenced in the programming.

Another object of this invention is to provide test means common to and time shared by a plurality of computer controlled variable resistance signal attenuating networks.

Another object of this invention is to provide a computer controlled variable resistance attenuating network test means with a resistance network approximating all of the operating modes of the attenuating network and arranged in parallel therewith.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

FIGURE 4 is a graphic showing of programmed controlled test signals and pulses for the test means of FIGURE 1.

FIGURE 5 is a chart showing the timed operating sequence of the device of FIGURE 1.

FIGURE 8 is a chart similar to FIGURE 5 and shows the timed operating sequence of the device of FIGURE 6.

Figure 1:
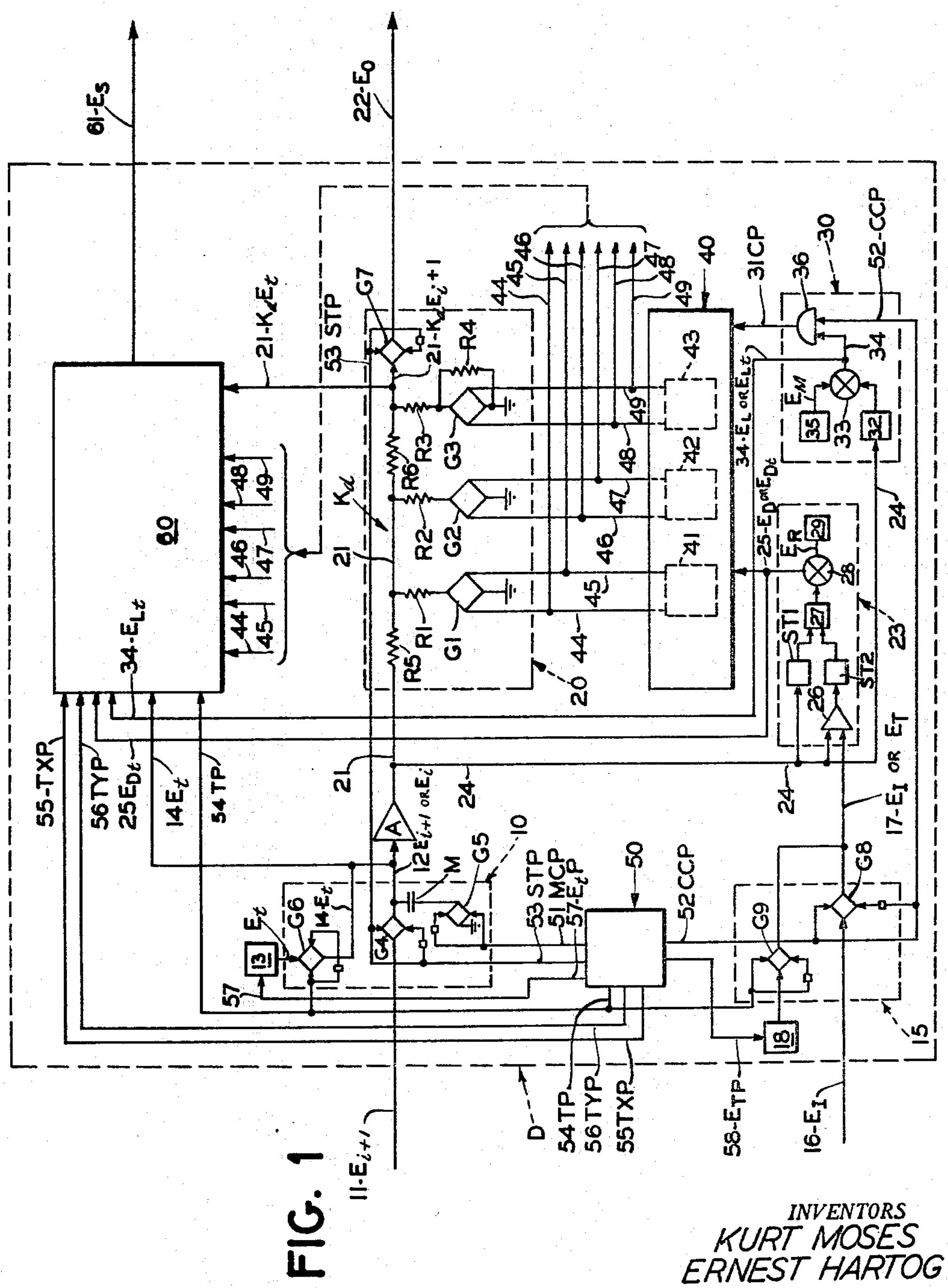
FIGURE 1 is a diagrammatic view of a computer-controlled variable resistance signal attenuating network having novel test means constructed according to the invention.

The device D of FIGURE 1 has a repetitive programmed operating sequence that is shown in FIGURE 5. Disregarding the novel test means, device D includes a sample-and-hold network 10 having an input line 11 for receiving a signal $E_{i+1}$. A diode gate G4 connects input line 11 to an output line 12 and transmits signal $E_{i+1}$ in response to control pulses. A memory means M is connected to output line 12 and to ground by a diode gate G5. Diode gate G5 is responsive to control pulses to control the memory means M that samples the transmitted signal $E_{i+1}$, and stores the sampled signal to provide a stored signal $E_i$ during the next sequence.

A gated input network 15 has an input line 16 for receiving a signal $E_I$. A diode gate G8 connects input line 16 to an output line 17 and transmits signal $E_I$ in response to control pulses.

A signal attenuating network 20 has a signal transmission line 21 connected to output 12 of network 10 and terminally connected to an output line 22 of device D by a diode gate G7 that transmits in response to control pulses to provide an output signal $E_O$. Line 21 includes a pair of series connected resistors R5 and R6, and has a pair of shunt resistor legs R1 and R2 connected to line 21 between resistor R5 and R6. Resistor legs R1 and R2 are connected to ground by diode gates G1 and G2, respectively. A third shunt resistor leg R3 is connected to line 21 between resistor R6 and the terminal connection of line 21 to gate G7 and is connected to ground by a diode gate G3 and a resistor R4 that is connected in parallel with the gate G3. The resistor legs R1, R2 and R3 with resistors R5 and R6 form voltage divider networks that are controlled by the transmitting and/or blocking states of gates G1, G2, and G3 providing either low or high impedance paths to ground for legs R1, R2 and R3, respectively.

Thus, diode gates G1, G2 and G3 control the operating mode of network 20 that provides controlled attenuation $K_d$ for modifying input signal $E_{i+1}$ when gates G4 and G7 are transmitting so the attenuated signal $K_dE_{i+1}$ transmitted by gate G7 provides the output signal $E_O$ in output line 22. Accordingly, attenuation $K_d$ varies incrementally in a range minimum value identified by a digital number 000 when gates G1, G2 and G3 are not transmitting in response to a bidirectional counter 40 having cascaded flip flops 41, 42, and 43 each in a 0 state, to maximum attenuation identified by a digital number 111 when gates G1, G2 and G3 are transmitting in response to flip-flops 41, 42 and 43 each in a 1 state.

The bidirectional digital counter 40 is fully discussed in the aforementioned patent application Serial No. 56,-033 and is comprised of three cascaded flip flops 41, 42, and 43 having respective output lines 44 and 45, 46 and 47, and 48 and 49 connected to gates G1, G2 and G3, respectively. The counter 40 controls the operating mode of network 20 to incrementally adjust attenuation $K_d$ by changing the transmitting and/or blocking states of diode gates G1, G2 and/or G3 according to a direction control signal $E_D$ and in response to a compute pulse CP. A gated network (not shown) in counter 40 connected to the inputs of flip-flops 41, 42, and 43 is connected to an output line 25 of a direction control network 23 that provides the direction control signals $E_D$, and to an output line 31 of a logic network 30 that provides compute pulses CP in response to control pulses. This gated network (not shown) between lines 25 and 31, and flip flops 41, 42 and 43 is arranged to control count-up/count-down operation of counter 40 in accordance with the direction control signal $E_D$ and in response to the compute pulse CP.

The direction control network 23 has a differential amplifier 26 that is connected to transmission line 21 of network 20 by an input line 24, and is also connected to output line 17 of gated input network 15. During a compute interval CI of the operating sequence, lines 17 and 24 transmit the input signal $E_I$ and the stored signal $E_i$, respectively, to the amplifier 26 that provides a signal representing the difference between the signals $E_I$ and $E_i$. A trigger circuit ST1 is also connected to line 24 and provides a fixed amplitude signal having a polarity corresponding to the transmitted stored signal $E_i$ while a second trigger circuit ST2 is connected to the output of the differential amplifier 26 and provides a fixed amplitude signal similar to the output signal of trigger circuit ST1 and has a polarity corresponding to the difference between signals $E_I$ and $E_i$. An absolute value network 27 is connected to trigger circuits ST1 and ST2 and provides a signal of positive polarity when the signals from both trigger circuits ST1 and ST2 are of the same polarity, and provides no signal when the signals from trigger circuits ST1 and ST2 are of opposite polarities. Network 27 is connected to a summing means 28 that receives a reference signal $E_R$ from a source 29 and provides the directional control signal $E_D$ that is applied by output line 25 to counter 40. The direction control signal $E_D$ is positive when network 27 provides an output signal and is negative when network 27 provides no signal.

The logic network 30 has an absolute value network 32 also connected by line 24 to line 21 of network 20, that provides an absolute value signal $|E_i|$ representing the transmitted stored signal $E_i$ during a compute interval CI. The output of network 32 is connected to a summing means 33 that is also connected to a source 35 providing a minimum reference signal $E_M$. Summing means 33 is connected to an AND gate 36 by a line 34 and provides a validated signal $E_L$ when the absolute value signal $|E_i|$ is greater than the minimum reference signal $E_M$. The AND gate 36 is connected to counter 40 by the output line 31 and transmits compute pulses CP in response to control pulses when qualified by the validated signal $E_L$.

A digital type programmer 50 provides all the control pulses and has an output line 51 connected to diode gate G5 for memory control pulses MCP, an output line 52 connected to diode gate G8 and AND gate 36 for compute control pulses CCP; and an output line 53 connected to diode gates G4 and G7 for sample and transfer pulses STP. The operating sequence of the device D shown in FIGURE 5 arbitrarily has a duration of 100 milliseconds.

The device D without the novel test means is in a quiescent state from 0 to 92 milliseconds. From 92 to 96 milliseconds, the device D operates in the compute interval CI established by the programmer 50 which provides a memory control pulse MCP that is applied to diode gate G5 by line 51, and a compute control pulse CCP that is applied to diode gate G8 and AND gate by line 52. With gates G5 and G8 transmitting, the stored signal $E_i$ and the input signal $E_I$ are transmitted to network 23 to derive the direction control signal $E_D$ that is applied to counter 40. Simultaneously, stored signal $E_i$ is transmitted to network 30 and validated to qualify AND gate 36 which transmits a compute pulse CP to counter 40 in response to the compute control pulse CCP. Counter 40 changes the operating mode of network 20 to incrementally adjust attenuation $K_d$ according to the direction control signal $E_D$ and in response to the comput pulse CP.

At 96 milliseconds, programmer 50 establishes a sample and transfer interval STI by rescinding the compute control pulse CCP, maintaining the memory control pulse MCP, and providing a sample and transfer pulse STP that is applied to diode gates G4 and G7. With gates G4 and G7 transmitting, signal $E_{i+1}$ is transmitted by network 10 to network 20 where it is modified by attenuation $K_d$; and diode gate G7 transmits the modified signal $K_dE_{i+1}$ to the output line 22 as output signal $E_O$. With gate G5 transmitting, memory means M simultaneously is charged by or samples the transmitted signal $E_{i+1}$ that is stored to provide the stored signal $E_i$ during the next sequence. At 100 milliseconds, programmer 50 rescinds all control pulses and device D returns to a quiescent state thus starting its next operating sequence.

The novel test means, according to the invention, may be a completely separate unit (not shown) that is connected to a device to be tested; however, it is shown as an integral part of the device D in FIGURE 1. The sample-and-hold network 10 includes a diode gate G6 connected to a source 13 providing a test signal $E_t$, corresponding to input signal $E_i$, that goes from positive polarity and exceeds the minimum reference signal $E_M$ to a negative polarity with an absolute value less than signal $E_M$ in response to a control pulse $E_tP$ from programmer 50. Diode gate G6 has an output line 14 connected to a test network 60 and to output line 12, and transmits in response to a control pulse to provide test signal $E_t$ to networks 20, 23, 30, and 60 during each test interval TI of the operating sequence. The gated input network 15 has a diode gate G9 connecting a source 18, providing a test signal $E_T$ corresponding to input signal $E_I$, to line 17. Test signal $E_T$ goes from positive to negative in response to a control pulse $E_TP$ and always exceeds test signal $E_t$. Diode gate G9 transmits in response to a control pulse to provide test signal $E_T$ to network 23 during each test interval TI.

During each test interval TI, programmer 50 provides control pulses $E_tP$ and $E_TP$ to respective sources 13 and 18 by output lines 57 and 58, respectively to control the respective test signal $E_t$ and $E_T$. Test pulses TP, TXP, and TYP are also provided and are applied to test network 60 by lines 54, 55, and 56, respectively. Line 54 also applies test pulse TP to diode gates G6 and G9. The terminal portion of transmission line 21 of network 20, between resistor leg R3 and diode gate G7, is connected to test network 60 to provide the test signal $E_t$ that is modified by attenuation $K_d$. Flip flop output lines 44 to 49 are also connected to test network 60 as are lines 25 and 34 of networks 23 and 30, respectively.

Figure 2:
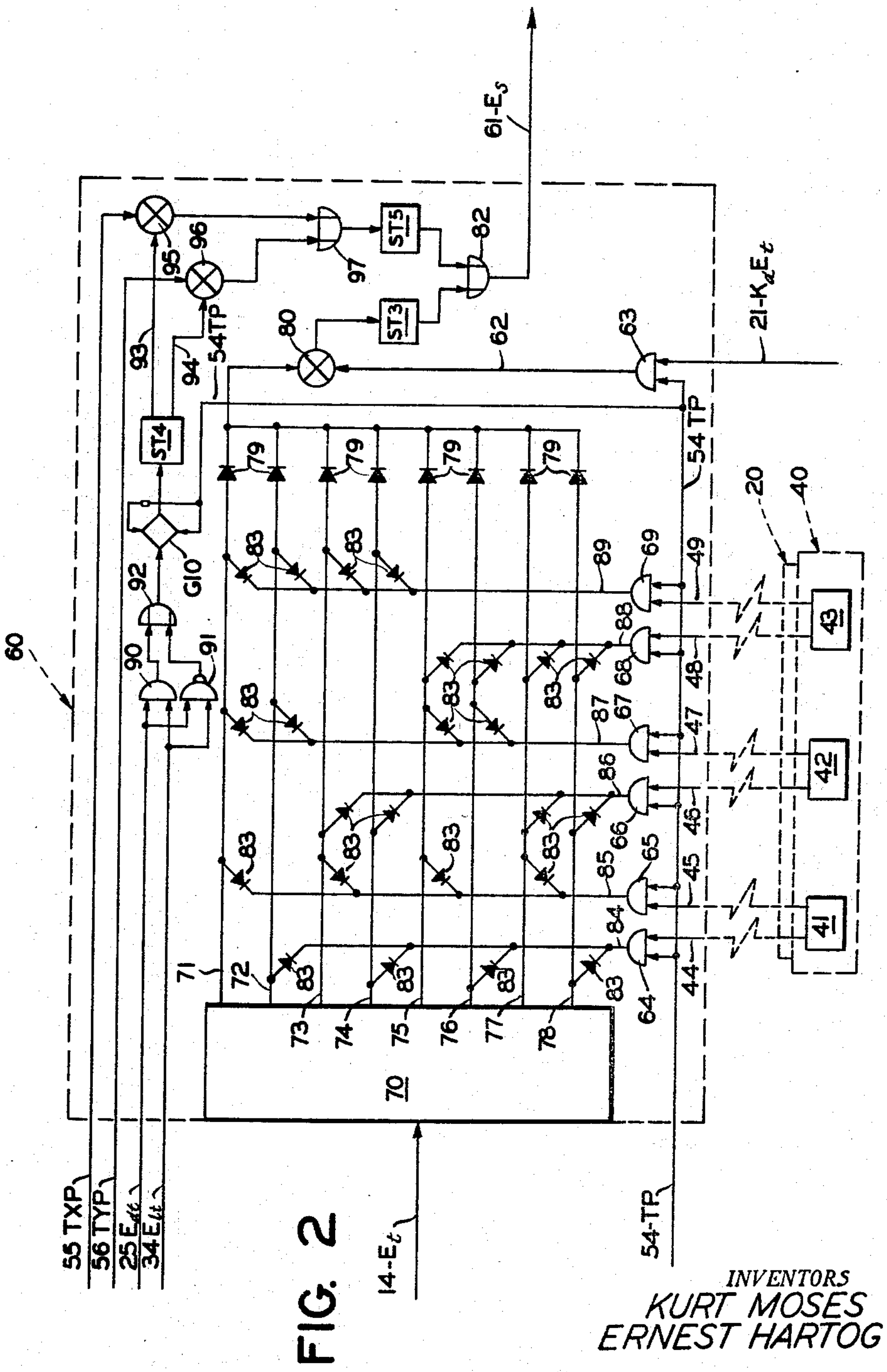
FIGURE 2 is a diagrammatic view including the circuitry of a gated comparing network of the novel test means of FIGURE 1.
Figure 3:
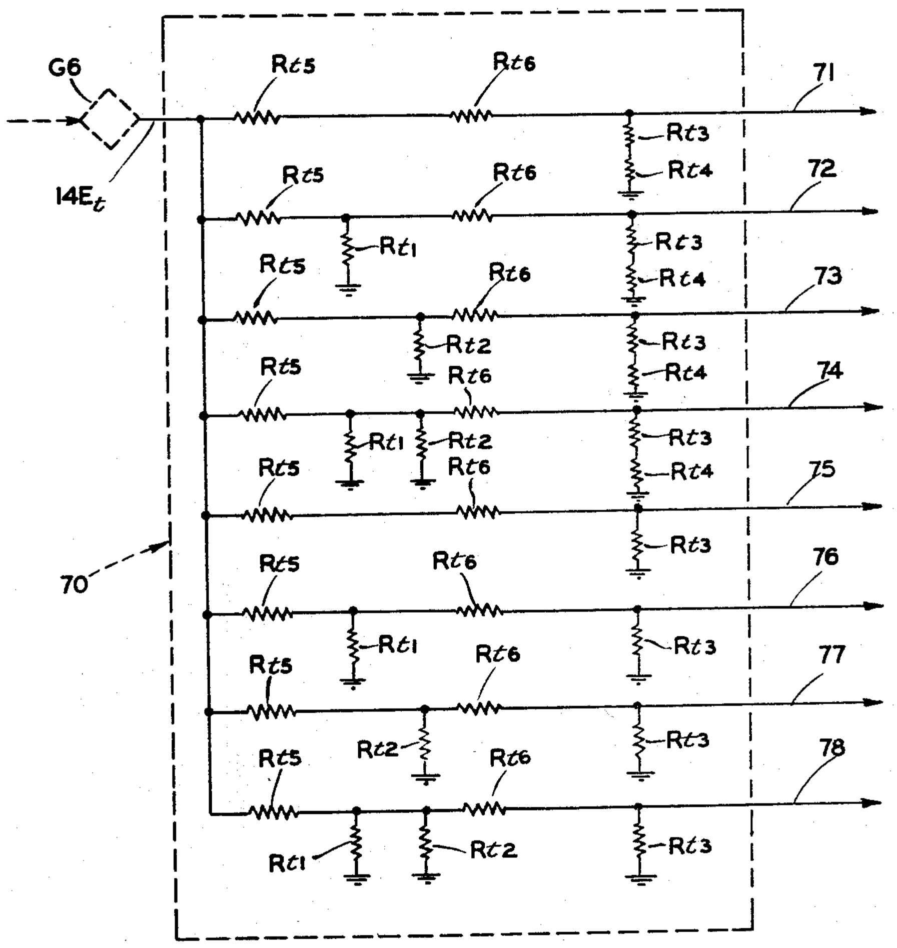
FIGURE 3 is a circuit diagram of a resistance network of the novel test means of FIGURE 1.

Test network 60 is comprised of an attenuating network 70 shown in detail in FIGURE 3 and a gated comparing network shown in detail in FIGURE 2. Referring specifically first to FIGURE 3, network 70 has eight transmission lines 71 to 78, each corresponding to one step of the attenuating range or operating mode of network 20. Gate output line 14 is connected to lines 71 to 78 to provide test signals $E_t$ when gate G6 is transmitting. Line 71 provides minimum attenuation $K_{dt}$ that corresponds to minimum attenuation $K_d$ of network 20 and in response to a digital count of 000 of counter 40. Line 78 provides maximum attenuation $K_{dt}$ that corresponds to maximum attenuation $K_d$ of network 20 and in response to a digital count of 111 of counter 40. Lines 72 to 77 provide progressively and incrementally increased attenuation $K_{dt}$ between the minimum and maximum, each corresponding to a progressively and incrementally increased attenuation $K_d$ of network 20. To provide attenuation $K_{dt}$, network 70 has resistors **R*t*1, R*t*2, R*t*3, R*t*4, R*t*5 and R*t*6 that correspond to resistor R1, R2, R3, R4, R5 and R6, respectively, of network 20. Each of the lines 71 to 78** include a pair of series connected resistors R*t*5 and R*t*6.

Line 71 also includes a resistance leg formed by series connected resistors R*t*3 and R*t*4 connected in series with resistor R*t*6 and connected to ground. Thus, line 71 corresponds to network 20 with gates G1, G2 and G3 in blocking states in response to a digital count 000 of counter 40.

Line 72 also includes a resistance leg formed by series connected resistors R*t*3 and R*t*4 connected in series with resistor R*t*6 and connected to ground, and a resistor R*t*1 connected between resistors R*t*5 and R*t*6 and connected to ground. Thus, line 72 corresponds to network 20 with gate G1 in a transmitting state and gates G2 and G3 in blocking states in response to a digital count 100 of counter 40.

Line 73 also includes a resistance leg formed by series connected resistors R*t*3 and R*t*4 connected in series with resistor R*t*6 and connected to ground, and a resistor R*t*2 connected between resistors R*t*5 and R*t*6 and connected to ground. Thus, line 73 corresponds to network 20 with gate G2 in a transmitting state and gates G1 and G3 in blocking states in response to a digital count 010 of counter 40.

Line 74 also includes a resistance leg formed by series connected resistors R*t*3 and R*t*4 connected in series with resistor R*t*6 and connected to ground, and two resistors R*t*1 and R*t*2 each connected between resistors R*t*5 and R*t*6 and connected to ground. Thus, line 74 corresponds to network 20 with gates G1 and G2 in transmitting states and gate G3 in a blocking state in response to a digital count 110 of counter 40.

Line 75 also includes a resistor R*t*3 connected between resistor R*t*6 and ground. Thus, line 75 corresponds to network 20 with gate G3 in a transmitting state and gates G1 and G2 in blocking states in response to a digital count of 001 of counter 40.

Line 76 includes a resistor R*t*1 connected between resistors R*t*5 and R*t*6 and connected to ground, and a resistor R*t*3 connected in series with resistor R*t*6 and connected to ground. Thus, line 76 corresponds to network 20 with gates G1 and G3 in transmitting states and gate G2 in a blocking state in response to a digital count 101 of counter 40.

Line 77 also includes a resistor R*t*2 connected between resistors R*t*5 and R*t*6 and connected to ground, and a resistor R*t*3 connected in series with resistor R*t*6 and connected to ground. Thus, line 77 corresponds to network 20 with gates G2 and G3 in transmitting state and gate G1 in a blocking state in response to a digital count 011 of counter 40.

Referring now to FIGURE 2, the ends of the lines 71 to 78 of network 70 are connected by diodes 79 to a common input of a summing means 80. Only one of the lines 71 to 78 provides an attenuated test signal $K_{dt}E_t$ at any one time, as will be further discussed. Transmission line 21 of network 20 is connected to summing means 80 by an AND gate 63 and its output line 62, and provides an attenuated test signal $K_dE_t$ in opposition to an attenuated test signal $K_{dt}E_t$. Summing means 80 is connected to a trigger circuit ST3 and provides an output signal only when the attenuated signals $K_{dt}E_t$ are not equal. Trigger circuit ST3 is connected to the output line 61 of test network 60 by an OR gate 82 and provides an alarm signal $E_S$ in response to a signal from summing means 80 to indicate incorrect response of network 20 to counter 40.

Although all of the lines 71 to 78 simultaneously attenuate test signal $E_t$ making available attenuated signals $K_{dt}E_t$ that correspond to signals $K_dE_t$ provided by network 20 in all modes, only one of the signals $K_{dt}E_t$ is transmitted to summing means 80 at any one time. Signal transmission by lines 71 to 78 is controlled by the bidirectional counter 40 as is the signal attenuating network 20. The flip flop output lines 44 to 49 are connected to respective AND gates 64 to 69 having output lines 84 to 89, respectively. Only one of the output lines of each of the flip flops 41, 42, and 43 has positive voltage at any time that is determined by the 0 or 1 state of the associated flip flop. Accordingly, positive voltage in lines 84, 86 and 88 denotes a 111 digital count, and positive voltage in lines 85, 87 and 89 denotes a 000 digital count.

Since each of the lines 71 to 78 provide an attenuated test signal $K_{dt}E_t$ according to a digital count 000 to 111 and corresponding to the attenuated signal $K_dE_t$ provided by network 20 in a corresponding operating mode, each of the lines 84 to 89 is selectively connected according to its digital count designation, 0 or 1, to four of the lines 71 to 78. The connections between lines 71 to 78 and lines 84 to 89 are made by diodes 83 that are arranged to provide low impedance paths for the attenuated test signals $K_{dt}E_t$ to ground through lines 84 to 89 and the respective AND gates 64 to 69. Positive voltage in any of the lines 84 to 89, provided by flip flop output lines 44 to 49, respectively, back biases the associated diodes 83 to block low impedance paths of the attenuated test signals $K_{dt}E_t$ to ground. Therefore, the gated interconnected lines 71 to 78 and lines 84 to 89 provide a gated matrix array that is responsive to a digital count for 000 to 111 for selectively blocking all three low impedance paths associated with one of the lines 71 to 78, according to the digital count of counter 40, which then transmits its attenuated test signal $K_{dt}E_t$ to summing means 80.

Output line 54 from programmer 40 is connected to and applies a test pulse TP to diode gates G6, G9, and G10, and to AND gates 63 to 69 during the test interval TI from 88 to 92 milliseconds as shown in FIGURE 5, to simultaneously and selectively provide corresponding attenuated test signals $K_dE_t$ and $K_{dt}E_t$ to summing means 80. Source 13 provides test signal $E_t$ to both networks 20 and 70. Since counter 40 controls attenuation $K_d$ to provide signal $K_dE_t$, and transmission by lines 71 to 78 to provide a corresponding signal $K_{dt}E_t$, an alarm signal $E_S$ in response to a signal from summing means 80 indicates a malfunction in network 20. In addition to testing network 20, the novel test means simultaneously tests the direction control network 23 and the logic network 30 during each test interval TI.

The programmer output lines 55 and 56 are connected to and transmit the respective test pulses TXP and TYP to summing means 95 and 96, respectively, of test network 60. Output line 25, in addition to being connected to counter 40, is connected to an AND gate 90 and to a NAND or AND NOT gate 91 of test network 60 and transmits a direction control signal $E_{Dt}$ that is provided by direction control network 23 according to test signals $E_t$ and $E_T$. Line 34, in addition to being connected to AND gate 36, is also connected to AND gate 90 and NAND gate 91 and transmits a validated signal $E_{Lt}$ provided by logic network 30 according to test signal $E_t$.

The AND gate 90 transmits a signal only when both signals $E_{Dt}$ and $E_{Lt}$ are positive, while the NAND gate 91 transmits a signal only when both signals $E_{Dt}$ and $E_{Lt}$ are negative. AND gate 90 and NAND gate 91 are connected to a trigger circuit ST4 by an OR gate 92 and a diode gate G10 that is also connected to programmer output line 54 and transmits in response to test pulse TP. Trigger circuit ST4 has output lines 93 and 94 that are connected to the summing means 95 and 96, respectively. In response to a signal from AND gate 90 or NAND gate 91, trigger circuit ST4 provides a signal only to summing means 95 to oppose a test pulse TXP, while in the absence of a signal from AND gate 90 or NAND gate 91, trigger circuit ST4 provides a signal only to summing means 96 to oppose a test pulse TYP. Only one test pulse TXP or TYP is available at any time. Summing means 95 and 96 are connected to a trigger circuit ST5 and provide a signal thereto only when the signal from trigger circuit ST4 and a test pulse TXP or TYP do not coincide. Trigger circuit ST5 is connected to output line 61 of network 60 by the OR gate 82 and provides an alarm signal $E_S$ in response to a signal from summing means 95 or 96.

The test interval TI of the operating sequence of device D, as shown in FIGURE 5, is established from 88 to 92 milliseconds and is divided into four 1 millisecond periods that are defined by the various combinations of pulses provided by programmer 50. At 88 milliseconds, programmer 50 provides a test pulse TP that is applied to AND gates 63 to 69 and to diode gates G6, G9, and G10 by line 54, and a test pulse TXP that is applied to summing means 95 by line 55. Test pulse TP activates the test means because diode gates G6 and G9 transmit and provide test signals $E_t$ and $E_T$, respectively, diode gate G10 transmits and permits a signal from AND gate 90 or NAND gate 91 to pass to trigger circuit ST4, AND gate 63 is qualified to pass an attenuated test signal $K_dE_t$ from network 20 to summing means 80, and AND gates 64 to 69 are qualified to pass signals from the respective flip flop output lines 44 to 49 to lines 84 to 89, respectively, for selectively back biasing diodes 83 so one of the lines 71 to 78 transmits an attenuated test signal $K_{dt}E_t$ to the summing means 80.

The test signal $E_t$ from source 13 is of positive polarity and is applied to both signal attenuating networks 20 and 70. The bidirectional counter 40 controls diode gates G1, G2, and G3 to establish a controlled operating mode of network 20, and controls signal transmission by one of the lines 71 to 78. Thus, if there is no malfunction of network 20, the attenuated test signal $K_dE_t$ applied to summing means 80 is equal to the attenuated test signal $K_{dt}E_t$ transmitted to summing means 80 by one of the lines 71 to 78. However, if the attenuated test signals $K_dE_t$ and $K_{dt}E_t$ applied to summing means 80 are not equal, a signal is applied to fire trigger circuit ST5 and provide an alarm signal $E_S$ in output line 61.

Test signal $E_t$, of positive polarity, is also applied to networks 23 and 30. With diode gate G9 transmitting, test signal $E_T$, also of positive polarity, is applied to network 23. In response to positive test signals $E_t$ and $E_T$, network 23 provides a positive direction control signal $E_{Dt}$ that is applied to AND gate 90 and NAND gate 91. In response to positive test signal $E_t$, network 30 provides a positive validated signal $E_{Lt}$ that is also applied to AND gate 90 and NAND gate 91. Signals $E_{Dt}$ and $E_{Lt}$ being positive, AND gate 90 transmits a signal to trigger circuit ST4 which fires and provides a signal that is applied by output line 93 to the summing means 95 in opposition to test pulse TXP. Coincidence of the signal from trigger circuit ST4 and the test pulse TXP provides no signal to fire trigger circuit ST5 and there is no alarm signal $E_S$. If the direction control network 23 or the logic network 30 is malfunctioning and trigger circuit ST4 fails to fire, the signal from the trigger circuit and the test pulse are not coincident and a signal is applied to fire trigger circuit ST5 and provide an alarm signal $E_S$ in the output line 61.

At 89 milliseconds, programmer 50 rescinds test pulse TXP, and provides test pulse TYP and control pulse $E_TP$. Since test signal $E_t$ is unchanged, the validated signal $E_{Lt}$ is the same. However, test signal $E_T$ is now of negative polarity in response to control pulse $E_TP$ and network 23 now provides a negative direction control signal $E_{Dt}$ that is applied to AND gate 90 and NAND gate 91. Signals $E_{Dt}$ and $E_{Lt}$ being of opposite polarities, neither AND gate 90 nor NAND gate 91 transmits a signal and trigger circuit ST4 does not fire. Trigger circuit ST4 now provides a signal to summing means 96 and in opposition to test pulse TYP applied to summing means 96 by line 56. Coincidence of the trigger signal and test pulse TYP provides no signal to fire trigger circuit ST5 to provide an alarm signal.

At 90 milliseconds, programmer 50 rescinds test pulse TYP and control pulse $E_TP$, and provides test pulse TXP and control pulse $E_tP$. Test pulse TXP is applied to summing means 95 by line 55. Test signal $E_T$ again becomes positive while test signal $E_t$ becomes negative and is exceeded by the minimum reference signal $E_M$ from source 35. With the minimum reference signal $E_M$ exceeding test signal $E_t$, network 30 provides an invalid or a negative signal $E_{Lt}$ to AND gate 90 and NAND gate 91. With test signal $E_t$ negative, and test signal $E_T$ positive, network 23 provides a negative direction control signal $E_{Dt}$ that is applied to AND gate 90 and NAND gate 91. Both signals $E_{Lt}$ and $E_{Dt}$ being negative, NAND gate 91 transmits a signal to fire trigger circuit ST4. Trigger circuit ST4 being fired provides a signal that is applied by line 93 to summing means 95 and in opposition to test pulse TXP. Coincidence of the signal from trigger circuit ST4 and test pulse TXP, therefore, provides no alarm signal $E_S$.

At 91 milliseconds, programmer 50 rescinds test pulse TXP, maintains control pulse $E_tP$, and provides test pulse TYP and control pulse $E_TP$. Test pulse TYP is applied to summing means 96 by line 56. Test signal $E_t$ remains unchanged so signal $E_{Lt}$, that is applied to AND gate 90 and NAND gate 91, is the same. Test signal $E_T$ goes negative in response to control pulse $E_TP$ and with negative test signal $E_t$, network 23 provides a positive direction control signal $E_{Dt}$ that is applied to AND gate 90 and NAND gate 91. With signals $E_{Lt}$ and $E_{Dt}$ being of opposite polarities, neither AND gate 90 nor NAND gate 91 provides a signal to fire trigger circuit ST4. The unfired trigger circuit ST4 provides a signal that is applied by line 94 to summing means 96 and in opposition with test pulse TYP. Coincidence of the signal from trigger circuit ST4 and the test pulse TYP, therefore, provides no alarm signal $E_S$.

At 92 milliseconds, programmer 50 rescinds control pulses $E_tP$ and $E_TP$, and test pulses TP, TXP, and TYP terminate the test interval TI. In the absence of test pulses TXP and TYP, there are no reference signals to summing means 95 and 96. Diode gates G6 and G9 now block the test signals $E_t$ and $E_T$, respectively, and diode gate G10 blocks a signal from trigger circuit ST4. Disqualified AND gate 63 blocks the attenuated signal $K_dE_t$ from network 20 while disqualified AND gates 64 to 69 block signals from counter 40 and none of the lines 71 to 78 transmit an attenuated test signal $K_{dt}E_t$ to summing means 80. Programmer 50 now provides pulses to start the compute interval CI, as previously discussed.

Figure 6:
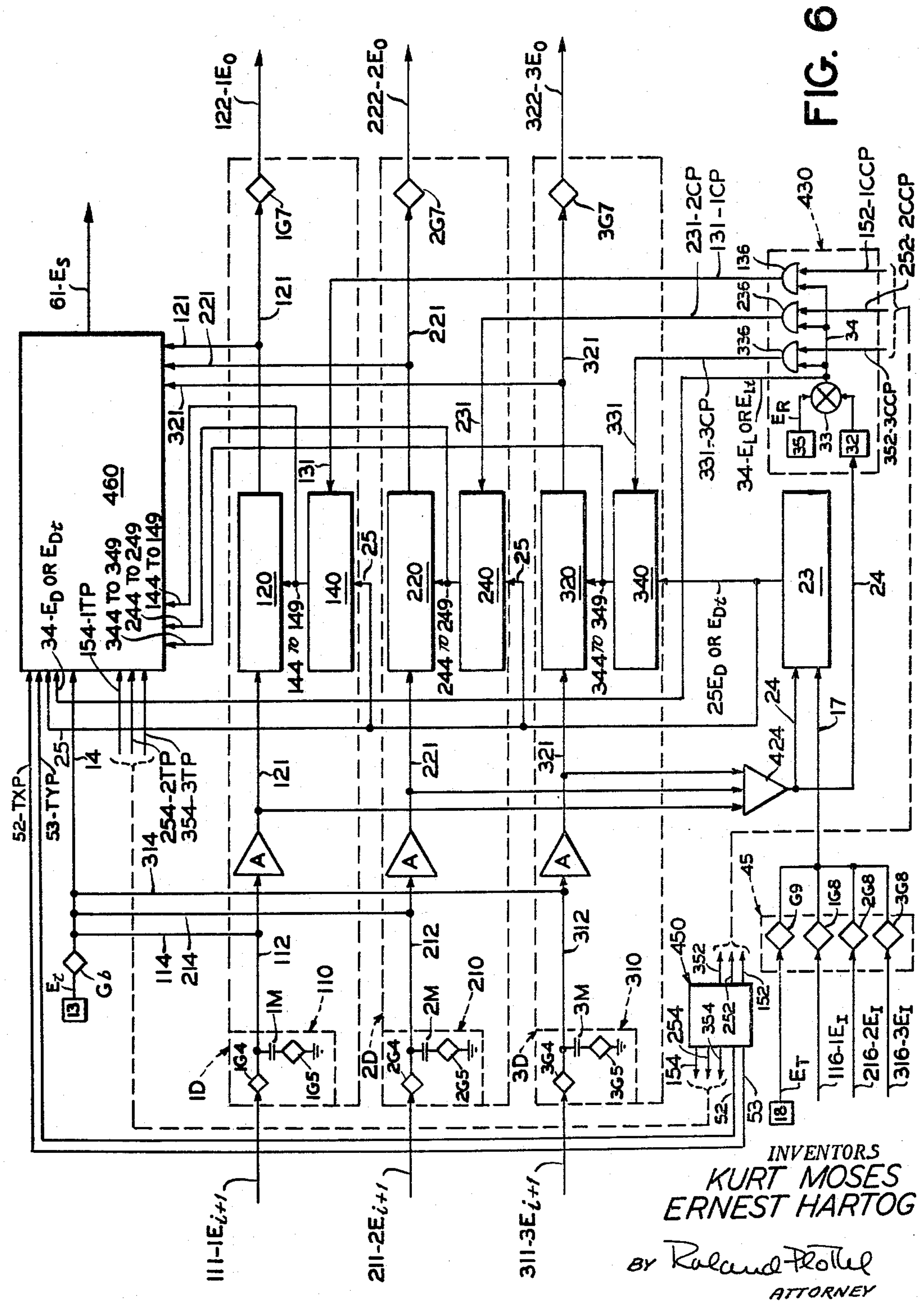
FIGURE 6 is a diagrammatic view of a plurality of computer controlled attenuating networks each similar to that of FIGURE 1 and having modified test means that is time shared by all the devices.

The novel test means is also adapted to multiple computer controlled signal attenuating networks. As shown in FIGURE 6, there are three devices 1D, 2D, and 3D, each corresponding to device D of FIGURE 1. However, the direction control network 23, a modified logic network 430, a modified programmer 450, and a modified test means are now common to and/or shared by the three devices. Identifying numbers, letters, and number letter combinations used to describe device D in conjunction with FIGURES 1 to 5 are used to identify corresponding parts and signals of the modified arrangement of FIGURES 6 to 8. Where multiple parts or signals of the modified arrangement correspond to a singular part of signal of device D and each of the multiple parts or signals is specific to one of the devices 1D, 2D and 3D, a 1, 2 or a 3 prefix is added to the original identifying number, letter, or number and letter combination to identify the device that it is associated with. Modified or new parts are identified by numbers in the 400 range.

Referring now to FIGURE 6, the devices 1D, 2D and 3D are essentially the same as device D. Diode gate G6 again connects source 13 of the test signal $E_t$ to the output line 14. Output line 14 is connected to the test network 460 and connected by lines 114, 214 and 314 to the respective output lines 112, 212, and 312 of sample-and-hold networks 110, 210 and 310, respectively.

A modified gated input network 415 has three input lines 116, 216 and 316 that receive input signals $1E_I$, $2E_I$, and $3E_I$, respectively, and are connected to output line 17 by the respective diode gates 1G8, 2G8 and 3G8. Diode gate G9 again connects source 18 of test signal $E_T$ to line 17.

Transmission lines 121, 221, and 321 of signal attenuating networks 120, 220 and 320, respectively, are connected to input line 24 of network 23 by an amplifier 424, while the output line 25 of network 23 is connected to the test network 460 and to all the bidirectional counters 140, 240, and 340.

Input line 24 is also connected to the modified logic network 430 which has three AND gates 136, 236 and 336 that are all connected to the summing means 33 by the line 34 and are qualified by validated signals $E_L$. The AND gates 136, 236, and 336 have respective output lines 131, 231, and 331 that are connected to bidirectional counters 140, 240, and 340 while line 34 is also connected to the test network 460.

Figure 7:
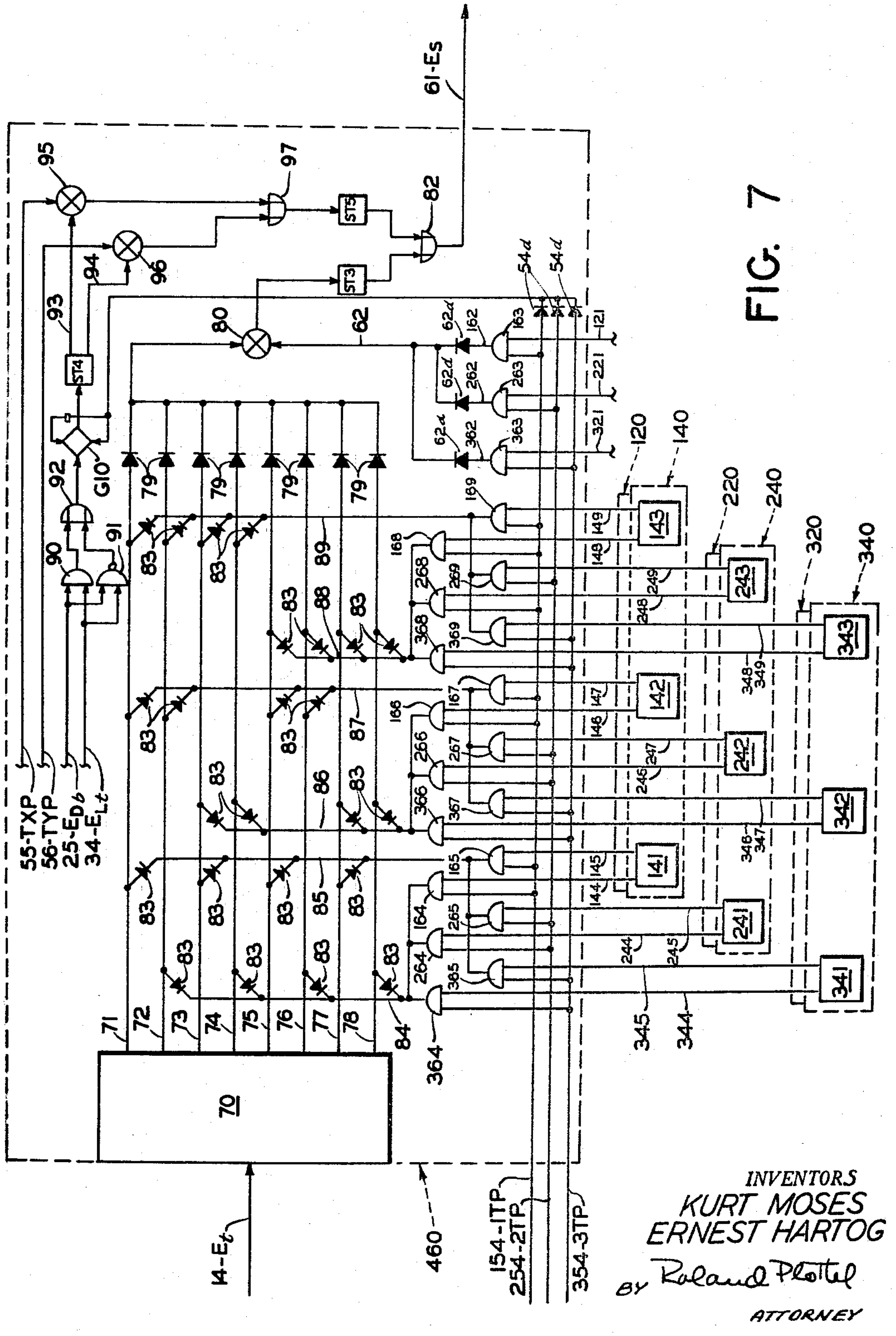
FIGURE 7 is similar to FIGURE 2 and shows the gated comparing network of the modified test means of FIGURE 6.

The test network 460 as shown in FIGURE 7 corresponds to test network 60 and is modified to be used with each of the devices 1D, 2D, and 3D. Accordingly, there are three series of AND gates 163 to 169, 263 to 269, and 363 to 369, each corresponding to AND gates 63 to 69 of network 60. AND gates 163, 263 and 363 connect the respective lines 121, 221, and 321 to summing means 80 by their output lines 162, 262, and 362, respectively, each having a diode 62*d* that is connected to line 62 which, in turn, is connected to summing means 80. Output lines 144, 244, and 344 of the respective flip flops 141, 142, and 143 are all connected to line 84 by AND gates 162, 264, and 364, respectively. Output lines 145, 245, and 345 of the respective flip flops 141, 241, and 341 are connected to line 85 by AND gates 165, 265, and 365, respectively. Output lines 146, 246, and 356 of the respective flip flops 142, 242, and 342 are connected to line 86 by AND gates 166, 266, and 366, respectively. Output lines 147, 247, and 347 of the respective flip flops 142, 242, and 342 are connected to line 87 by AND gates 167, 267, and 367, respectively. Output lines 148, 248, and 348 of the respective flip flops 143, 243, and 343 are connected to line 88 by AND gates 168, 268, and 368, respectively, and, output lines 149, 249, and 349 of the respective flip flops 143, 243, and 343 by AND gates 169, 269, and 369, respectively.

Thus, when testing device 1D, AND gates 163 to 169 must be qualified by a test pulse 1TP; when testing device 2D, AND gates 263 to 269 must be qualified by a test pulse 2TP; and, when testing device 3D, AND gates 363 to 369 by a test pulse 3TP. Test pulses 1TP, 2TP, and 3TP are provided by the modified programmer 450 and are applied to the respective AND gates 163 to 169, 263 to 269, and 363 to 369 by programmer output lines 154, 254, and 354, respectively. Lines 154, 254, and 354 are each connected to line 54 by a diode 54*d* to energize diode gate G10 to transmit. Line 54 is also connected to diode gates G6 and G9 (not shown).

In addition to lines 154, 254, and 354, the programmer 450 has lines 151, 251, and 351 (not shown) connected to respective diode gates 1G5, 2G5, and 3G5 for memory control pulses 1MCP, 2MCP, and 3MCP, respectively; lines 152, 252, and 352 connected to respective AND gates 136, 236, and 336, and respective diode gates 1G8, 2G8, and 3G8 (not shown) for compute control pulses 1CCP, 2CCP, and 3CCP, respectively; lines 153, 253, and 353 (not shown) connected to the respective diode gates 1G4 and 1G7, 2G4 and 2G7, and 3G4 and 3G7, for sample and transfer pulses 1STP, 2STP, and 3STP, respectively; lines 55 and 56 connected to the respective summing means 95 and 96 for test pulses TXP and TYP, respectively; and lines 57 and 58 connected to respective sources 13 and 18 for control pulses $E_tP$ and $E_TP$, respectively.

The programmer 450 provides control pulses to sequence the devices 1D, 2D, and 3D as is shown in FIGURE 8. It can be clearly seen, each of the devices 1D, 2D, and 3D are in a quiescent state for 88 milliseconds and has a test interval TI, a compute interval CI, and a sample and transfer interval STI, each of 4 milliseconds duration of the 100 millisecond duration. Each of the devices 1D, 2D, and 3D operates in the same manner as device D.

Accordingly, it can be readily seen that novel test means is provided for testing the attenuating network and computer signal providing means for a programmed computer controlled signal attenuating network. In addition, the novel test means is adapted to the time shared by a plurality of such devices.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device of the kind described comprising programming means, a source of signals controlled by the programming means, an attenuating network with operating modes, computer means connected to the network for controlling the network operating mode according to a digital count, said network being connected to the source and providing an attenuated signal according to the digital count, a matrix having gated transmission lines with attenuation means connected to the computer means for controlling the transmission lines to provide an attenuated signal according to the digital count, and means connected to the transmission lines and to the network for comparing the attenuated signals from the network and from the matrix.

2. Test means for a programmed device having means arranged to provide control pulses for programming, a network with operating modes for attenuating a signal, computer means connected to the network for controlling the network operating mode according to a digital count, gated means controlled by the programming means and providing a test signal in response to a control pulse and connected to the network, the network providing an attenuated test signal according to the digital count, a matrix having gated transmission lines with attenuation means connected to the computer means for controlling the transmission lines to provide an attenuated test signal according to the digital count of the computer means, and means connected to the transmission lines and the network for indicating when the attenuated test signals from the network and from the matrix are not equal.

3. The test means according to claim 2 in which each transmission line corresponds to one of the operating modes of the network and includes means for attenuating the test signal to provide an attenuated test signal equal to the attenuated test signal provided by the network in the corresponding operating mode.

4. The test means according to claim 2 in which each transmission line includes gate means connected to the programming means and the computer means and is controlled thereby for controlling signal transmission.

5. A system comprising (a) an attentuation network adapted to provide incremental amounts of attenuation, (b) control means connected to the network for selecting a particular incremental amount of attenuation, (c) a second attenuation network simultaneously providing all the incremental amounts of attenuation provided by the first network, (d) gating means connected to the second attenuation network and to the control means for enabling a particular incremental amount of attenuation as selected by the control means, (e) a source connected to both networks for applying thereto a signal to be attenuated, (f) comparator means connected to the first attenuation network and to the gating means for comparing the signal as attenuated by the first and second networks and providing a warning signal in accordance with a difference in the amount of attenuation.

6. In a system of the kind defined in claim 5, the first attenuation network comprising a plurality of resistors arranged in series parallel combination, and second gating means connected in parallel with at least one of the parallel resistors to short the resistor in accordance with the control means to vary the attenuation of the network.

7. In the system of the kind defined in claim 5, the second attenuation network comprising a plurality of resistors arranged in series parallel combinations, the combinations being equal in number to the increments of attenuation provided by the first network, and the gating means comprising a diode matrix having several transmission lines each connected to a different combination.

8. A system for attenuating an input signal in accordance with a control signal comprising in combination (a) a first attenuation network adapted to receive the input signal and to provide an output signal having one of several incremental amounts of attentuation,
(b) control means adapted to receive the control signal and connected to the network for selecting a particular incremental amount of attenuation in accordance with the control signal,
(c) a second attenuation network adapted to receive the input signal and provide output signals incrementally attenuated in the several amounts provided by the first network,
(d) gating means connected to the second attenuation network and to the control means for transmitting a particular attenuated signal as selected by the control means which corresponds to the attenuation selected for the first network, and
(e) comparator means connected to the first attenuation network and to the gating means for receiving the attenuated signals therefrom and providing a warning signal in accordance with a difference between the attenuated signals.

9. Test means for a programmed device having an attenuation network providing incremental amounts of attenuation in accordance with the output from a bidirectional counter controlled by a direction control network for causing the counter to count up and count down in accordance with the difference between two signals and a logic control network responsive to the signals for providing count pulses to the counter when one of the two signals exceeds a predetermined amount, comprising (a) means for providing two test signals,
(b) programming means connected to the signal means for controlling the amplitudes of the signals,
(c) gating means connecting the signal means to the control networks and connected to the programming means for passing the test signals to the control networks at discrete time intervals in accordance with the programming means,
(d) a test attenuation network providing the same incremental amounts of attenuation provided by the device attenuation network, the signal means being connected to both attenuation networks for applying thereto signals to be attenuated,
(e) second gating means connected to the bidirectional counter and controlled thereby and connected to the test attenuation network for passing the incrementally attenuated signal corresponding to the amount of attenuation required from the device attenuation network, and
(f) comparator means connected to the attenuation networks to receive the attenuated signals therefrom and provide a warning signal in accordance with a difference in the amount of attenuation.

10. Test means for a programmed device having a direction control network adapted to receive two signals and provide an output signal having one of two polarities according to polarity differences between the two received signals, a logic control network adapted to receive one of the signals and provide an output signal having one of two polarities in accordance with the amplitude of the applied signal relative to a reference signal, comprising (a) source means providing two test input signals and a first and a second test polarity signal,
(b) programming means connected to the source means for varying the polarity of the test input signals,
(c) gating means connecting the source means to the control networks and controlled by the programming means for applying the test signals to the control networks at discrete time intervals,
(d) polarity sensing means connected to the control networks for receiving output signals therefrom and providing a first polarity signal corresponding to the first test polarity signal when the outputs are alike and a second polarity signal corresponding to the second test polarity signal when the outputs are of a different polarity,
(e) comparator means connected to the polarity sensing means and to the source means for comparing the first polarity signal with the first test polarity signal and the second polarity signal with the second test polarity signal and provide a warning signal in accordance with any difference between the compared signals.

11. In the test means of the kind defined in claim 10, the comparator means comprising two summing means each receiving respectively the first and second polarity signals and receiving respectively the first and second test polarity signals.

12. In the test means of the kind defined in claim 10, the polarity sensing means comprising a NAND gate and an AND gate connected to receive the output signals from the control networks and a trigger means receiving the outputs from the gates and providing a first polarity signal when there is an output from the gates and the second polarity signal in the absence of an output from the gates.

13. A system comprising (a) a first attenuation network adapted to provide incremental amounts of attenuation,
(b) a bidirectional counter connected to the attenuation network for controlling the amount of attenuation,
(c) a direction control network connected to the bidirectional counter and adapted to receive two signals and provide to the bidirectional counter a polarity signal which varies in polarity in accordance with a predetermined difference between the two signals for causing the counter to count up and count down,
(d) a logic control network connected to the counter and adapted to receive one of the signals and provide a count signal to the counter when the signal exceeds a predetermined amplitude,
(e) signal means for providing two test signals,
(f) programming means connected to the signal means for controlling the polarities of the test signals,
(g) gating means connecting the signal means to the control networks and controlled by the programming means for passing the test signals to the control networks at discrete time intervals in accordance with the programming means,
(h) a test attenuation network providing the same incremental amounts of attenuation provided by the first attenuation network, the signal means being connected to both attenuation networks for applying thereto a common signal to be attenuated,
(i) second gating means connected to the bidirectional counter and controlled thereby and connected to the test attenuation network for passing the incrementally attenuated signal corresponding to the amount of attenuation required from the first attenuation network,
(j) first comparator means connected to receive the attenuated signals from the attenuation networks and provide a warning signal in accordance with a difference in the amount of attenuation, (k) second comparator means connected to the control networks and responsive to the polarity signal and count signal therefrom and providing an output when the polarity signal and count signal are of like polarity, (l) a trigger circuit connected to the second comparator means for receiving the output therefrom and providing a first or second output corresponding respectively to the presence or absence of an output from the second comparator means, (m) first summing means connected to the trigger circuit to receive the first output therefrom, (n) second summing means connected to the trigger circuit to receive the second output therefrom, the signal means being connected to the first summing means and providing a first polarity signal equal in amplitude and of opposite polarity to the first output signal when the two test signals have the predetermined difference and the test signal exceeds a predetermined amplitude, and when the two test signals have a difference other than the predetermined difference and the test signal is less than the predetermined amplitude, and the signal means being connected to the second summing means for providing a second polarity signal equal in amplitude and of opposite polarity to the second output signal when the test signals have the predetermined difference and the test signal is less than the predetermined amplitude, and when the test signals have a difference other than the predetermined difference and the test signal exceeds the predetermined amplitude.

14. A system of the kind described in claim 13 in which the second comparator means includes an AND gate for receiving the signals and for passing the signals only when they are of one like polarity, a NAND gate for receiving the signals, inverting, and passing the inverted signals only when the signals are of the other like polarity, and an OR gate connected to the AND and NAND gates for receiving signals therefrom and providing an output corresponding to the presence or absence of a signal.

15. A circuit for determining the relative polarity of two input signals comprising (a) an AND gate for receiving the signals and for passing the signals only when they are of one like polarity, (b) a NAND gate for receiving the signals, inverting, and passing the inverted signals only when the signals are of the other like polarity, (c) an OR gate connected to the AND and NAND gates for receiving the signals therefrom and providing an output corresponding to the presence or absence of a signal, (d) a trigger circuit connected to the OR gate for receiving the output therefrom and providing a first or second output corresponding to the presence or absence of an output from the OR gate, (e) first summing means connected to the trigger circuit and receiving the first output therefrom, (f) second summing means connected to the trigger circuit and receiving the second output therefrom, (g) means connected to the first and second summing means and providing to the first summing means a first test signal equal in amplitude and of opposite polarity to the first output signal when the input signals are of the same polarity and providing to the second summing means a second test signal equal in amplitude and of opposite polarity to the second output signal when the output signals are of opposite polarity.

16. A circuit for determining the relative polarity of two input signals, comprising (a) a comparator receiving the signals and providing an output only when they are of like polarity, (b) a trigger circuit connected to the comparator for receiving the output therefrom and providing a first or second trigger signal corresponding to the presence or absence of an output, (c) first summing means connected to the trigger circuit and receiving the first trigger signal therefrom, (d) second summing means connected to the trigger circuit and receiving the second trigger signal therefrom, (e) means connected to the first and second summing means and providing to the first summing means a first test signal equal in amplitude and of opposite polarity to the first trigger signal when the input signals are of the same polarity and providing to the second summing means a second test signal equal in amplitude and of opposite polarity to the second trigger signal when the input signals are of opposite polarity.

References Cited by the Examiner

UNITED STATES PATENTS

| | | | |
|---|---|---|---|
| 2,798,199 | 7/1957 | Potter | 324—62 |
| 2,848,532 | 8/1958 | Weida | 235—177 X |
| 2,950,437 | 8/1960 | Stahl | 324—73 |
| 2,977,535 | 3/1961 | O'Connor et al. | 324—73 |
| 2,985,774 | 5/1961 | Carbone et al. | 307—88.5 |
| 2,996,666 | 8/1961 | Baker | 324—73 |
| 3,082,374 | 3/1963 | Buuck | 324—73 |
| 3,107,306 | 10/1963 | Dobbie | 307—88.5 |
| 3,132,304 | 5/1964 | Lukoff. | |
| 3,143,645 | 8/1964 | Armstrong | 225—177 |
| 3,182,253 | 5/1965 | Dorsch et al. | 324—73 X |
| 3,192,375 | 7/1965 | Henn et al. | 235—197 |

MALCOLM A. MORRISON, *Primary Examiner.*

I. KESCHNER, *Assistant Examiner.*